United States Patent
Dai

(10) Patent No.: US 7,309,379 B2
(45) Date of Patent: Dec. 18, 2007

(54) MOVING BED ADSORBER/DESORBER AND LOW FLOW (HIGH YIELD) DESORBER DEVICES AND THEIR METHODS OF USE

(75) Inventor: XiangFeng Dai, deceased, late of Bakersfield, CA (US); by Dong Dai, legal representative, Bakersfield, CA (US)

(73) Assignee: TW Environmental, Inc., Ashland, KY (US)

( * ) Notice: Subject to any disclaimer, the term of this patent is extended or adjusted under 35 U.S.C. 154(b) by 479 days.

(21) Appl. No.: 10/672,926

(22) Filed: Sep. 26, 2003
(Under 37 CFR 1.47)

(65) Prior Publication Data

US 2004/0226450 A1    Nov. 18, 2004

Related U.S. Application Data

(60) Provisional application No. 60/424,895, filed on Nov. 8, 2002.

(51) Int. Cl.
*B01D 53/08* (2006.01)
(52) U.S. Cl. .............................. 95/110; 95/111; 95/117; 95/143; 96/123; 96/150
(58) Field of Classification Search ................. 95/107, 95/110–112, 115, 117–123, 126, 143; 96/123, 96/144, 126–130, 150, 153, 154
See application file for complete search history.

(56) References Cited

U.S. PATENT DOCUMENTS

| | | | | |
|---|---|---|---|---|
| 1,823,895 A * | 9/1931 | Gray | ............................ | 34/167 |
| 2,780,310 A * | 2/1957 | Schaub | ......................... | 95/110 |
| 2,834,119 A * | 5/1958 | Schaub | ......................... | 34/505 |
| 3,296,775 A * | 1/1967 | Squires | ........................ | 95/276 |
| 3,410,055 A * | 11/1968 | Zenz | ............................ | 95/276 |
| 3,708,981 A * | 1/1973 | Johswich et al. | ............. | 95/110 |
| 3,716,969 A * | 2/1973 | Maeda | ......................... | 96/150 |
| 3,912,466 A * | 10/1975 | Zenz | ............................ | 95/276 |
| 3,928,532 A * | 12/1975 | Squires | ........................ | 423/210 |
| 4,017,278 A * | 4/1977 | Reese | ........................... | 95/268 |

(Continued)

FOREIGN PATENT DOCUMENTS

DE        38 30 618 A1 *    3/1990

(Continued)

*Primary Examiner*—Frank M. Lawrence
(74) *Attorney, Agent, or Firm*—Robert D. Buyan; Stout, Uxa, Buyan & Mullins, LLP.

(57) ABSTRACT

Moving bed adsorber and desorber apparatus and methods, wherein adsorbent material (e.g., beads of resin) moves over a series of vane members and a fluid flow passes between the vane members and through the flowing bed of adsorbent. An adsorbent depth regulator is positioned a spaced distance from the vanes to regulate the depth of the flowing adsorbent bed. In some embodiments, the adsorbent flow may be divided into 2 or more separate streams that pass over 2 or more separate arrays of vane members. Also disclosed are shell and tube desorber apparatus wherein the shell and tube are positioned at certain angle(s) to optimize flow and recovery of contaminant from an adsorbent material and/or wherein vacuum is applied to the adsorbent concurrently with heat to enhance the desorption of contaminant from the adsorbent material.

80 Claims, 7 Drawing Sheets

U.S. PATENT DOCUMENTS

| | | | | |
|---|---|---|---|---|
| 4,083,701 A | * | 4/1978 | Noack | 95/14 |
| 4,126,435 A | * | 11/1978 | Reese | 55/474 |
| 4,149,858 A | * | 4/1979 | Noack et al. | 95/110 |
| 4,354,862 A | * | 10/1982 | Sgaslik | 55/296 |
| 4,436,701 A | * | 3/1984 | Richter et al. | 422/173 |
| 4,586,941 A | * | 5/1986 | Cooley | 96/147 |
| 4,650,647 A | * | 3/1987 | Kito et al. | 422/169 |
| 4,670,226 A | * | 6/1987 | Furuyama et al. | 422/216 |
| 4,725,290 A | * | 2/1988 | Ohlmeyer et al. | 95/110 |
| 4,744,804 A | * | 5/1988 | Furuyama et al. | 95/111 |
| 4,869,734 A | * | 9/1989 | Jacquish | 95/111 |
| 5,149,342 A | * | 9/1992 | Mestemaker et al. | 95/141 |
| 5,356,462 A | * | 10/1994 | Bruggendick | 96/150 |
| 5,527,514 A | * | 6/1996 | Watanabe et al. | 422/171 |
| 5,556,443 A | * | 9/1996 | Alexander | 65/27 |
| 5,624,644 A | * | 4/1997 | McKenna et al. | 422/177 |
| 5,628,819 A | * | 5/1997 | Mestemaker et al. | 96/122 |
| 5,932,179 A | * | 8/1999 | Watanabe et al. | 422/177 |
| 6,562,113 B1 | * | 5/2003 | Aykanian et al. | 96/143 |
| 6,783,572 B1 | * | 8/2004 | Squires | 95/274 |

FOREIGN PATENT DOCUMENTS

| | | | |
|---|---|---|---|
| EP | 0057468 A2 | * | 8/1982 |
| EP | 0489241 A1 | * | 6/1992 |
| GB | 2035128 | * | 6/1980 |
| GB | 2196550 | * | 5/1988 |
| WO | WO 92/06770 A1 | * | 4/1992 |

* cited by examiner

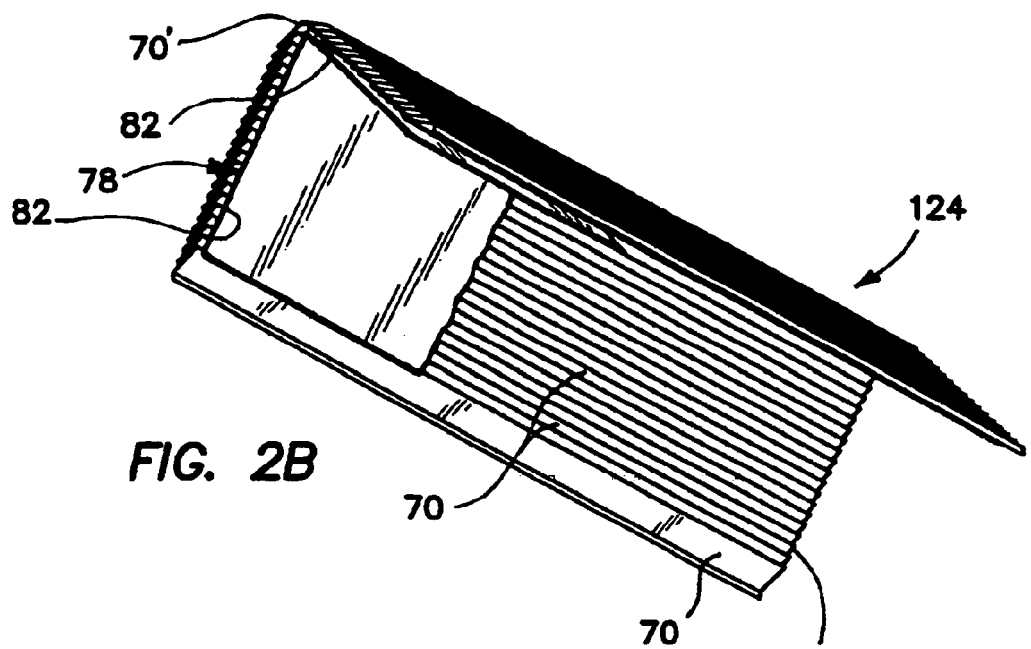
FIG. 2B
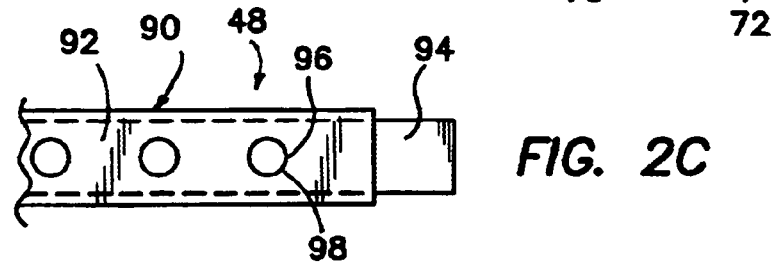
FIG. 2C
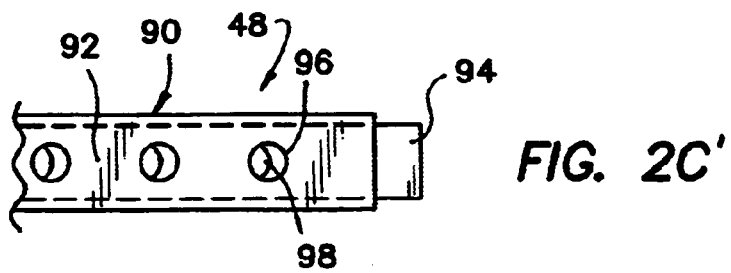
FIG. 2C'
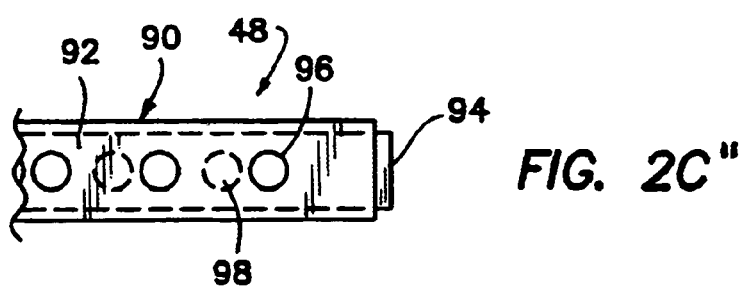
FIG. 2C"

MOVING BED ADSORBER/DESORBER AND LOW FLOW (HIGH YIELD) DESORBER DEVICES AND THEIR METHODS OF USE

RELATED APPLICATIONS

This application claims priority to previously filed Provisional Application Ser. No. 60/424,895 filed on Nov. 8, 2002, the entirety of which being hereby expressly incorporated herein by this specific reference.

FIELD OF THE INVENTION

The present invention generally relates to devices and methods for removing and recovering adsorbable contaminants from contaminant-laden fluid streams and for regeneration of adsorbents used for removal of such contaminants, and more specifically relates to devices and methods for removing and/or recovering such contaminants using a substantially uniform, continuous, moving bed adsorber device and system.

BACKGROUND OF THE INVENTION

Various types of contaminants, including volatile organic compounds ("VOC") and other adsorbable compounds may be contained in industrial fluid streams, such as air or water being exhausted from an industrial reactor, sewage treatment facility, distillation system or other chemical/industrial process equipment. In many instances, release of the adsorbable contaminants into the environment is prohibited or regulated due to the toxicity of the contaminants. In other instances, it may be desirable to recover and recycle the contaminants due to their high cost or scarcity.

A number of adsorption and desorption devices have been developed for enabling removal and/or recovery of adsorbable contaminants from contaminated fluid streams. These have included "fixed bed" adsorbers and desorbers wherein a fixed volume of an adsorbent material, for example, commercially available resin pellets, is contained. A feed stream, for example a gas having an adsorbable component, for example an adsorbable contaminant, is directed to enter one end of a packed bed of adsorbent particles, and the gas having at least some of the contaminant removed therefrom exits from another end of the bed. This process continues for a sufficient period of time, determined by the time when the adsorbent bed becomes saturated with the adsorbed components and the concentration of the contaminant gas in the exit stream begins to increase. Reducing the pressure and/or increasing the temperature of the adsorbent particles and by withdrawing the evolved contaminants from the adsorbent bed sometimes accomplish at this point regeneration of the adsorbent.

These fixed bed adsorption systems are highly inefficient from an operational standpoint. Fixed bed systems operate in a "batch mode" even when fluid flow into the adsorption system is continuous. This requires a plurality of fixed beds because each fixed bed is periodically taken off line for adsorbent regeneration and another fixed bed is brought on line to replace it. Fixed beds are designed for a specific flow rate and reasonable cycle time. This requires significant power usage under design conditions because of the high pressure drop. The fixed bed cannot operate efficiently when the contaminant stream flow rate is significantly lower than the design rate because of poor gas distribution causing lower overall contaminant capacity on the resin. A contaminant stream flow rate which higher than design flow rate causes higher pressure drops requiring larger blowers and thus higher operational costs.

In order to increase operational efficiency of the packed bed adsorption systems, a number of "fluidized bed" adsorbers have been developed, wherein adsorbent particles are placed within a series of perforated trays or containers within a unit, and a contaminated fluid stream is passed through the perforations in the trays or containers with sufficient velocity to cause movement or lifting of the adsorbent particles. The beds are designed to allow the resin to flow by gravity from the exit of one tray to the entrance to the next tray.

Fluidized beds in general allow for a reasonable adsorption of contaminant at a relatively high flow rate and low pressure drop. Continuously operating fluidized beds also allow for a variation in resin flow that is essential if the contaminant concentration changes. However, to get a high percentage of contaminant removal, more trays are required which increases pressure drop and resin inventory in the system. Fluidized beds must operate at a flow rate above the minimum flow rate for fluidization of the resin particles and below the minimum flow rate required for entrainment of the particles (carrying of the resin particles by the vapor stream). Fluidized beds also cause break up of the resin particles resulting in relatively high resin replacement.

The prior art has also included a flowing bed adsorption/desorption system wherein a flow of sorption media (i.e., an adsorbent) passes between narrowly spaced porous plates. A stream of contaminated air may flow inwardly through one porous plate, through the flowing bed of sorbent and outwardly through the other porous plate. Contaminants in the air are thus adsorbed by the sorbent. It is axiomatic, however, that the openings in the porous plates be smaller than the diameter of the sorbent particles to prevent the sorbent particles from escaping outwardly through the porous plates. This system is described in U.S. Pat. No. 6,562,113 B1 (Aykanian et al.), which is expressly incorporated herein by reference.

Other examples of adsorbers and desorbers of the prior art include but are not necessarily limited to those described in U.S. Pat. No. 5,628,819 (Mestemaker et al.), U.S. Pat. No. 5,149,342 (Mestemaker et al.) and U.S. Pat. No. 4,586,941 (Cooley), the entireties of which are expressly incorporated herein by reference.

In view of the shortcomings and limitations of the prior art, there exists a need for the development of new devices and methods for adsorption/desorption of adsorbable contaminants from fluid streams which allow for continuous exchange of the adsorbent without requiring interruption of the adsorption/desorption process and/or without the need for maintaining restricted range flow rates of the contaminated fluid stream or regeneration fluid stream in order to attain optimal performance of the system.

It is an object of the invention to provide an effective and efficient moving bed adsorber apparatus for removing contaminants from a fluid stream and/or replenishing spent adsorbent materials.

It is a further object of the invention to provide a moving bed adsorber apparatus that provides a means for optimizing adsorption by the adsorbent materials.

It is a further object of the invention to provide a moving bed adsorber apparatus that maintains a substantially constant depth or thickness of adsorbent free from bridging of the adsorbent particles.

It is a further object of the invention to provide a moving bed adsorber apparatus that can effectively process a fluid stream having a very low flow rate.

It is a further object of the invention to provide a moving bed adsorber apparatus that can effectively process a fluid stream having a very high flow rate It is a further object of the invention to provide a moving bed adsorber apparatus that can process a high adsorbant mass flow using a relatively low adsorbent inventory.

It is a further object of the invention to provide a moving bed adsorber apparatus that causes relatively low mechanical abrasion of resin particles and thus has relatively low resin attrition.

It is a further object of the invention to provide a moving bed adsorber apparatus that can accommodate a wide range of operating conditions.

It is a further object of the invention to provide a moving bed adsorber that can be effectively operated using non-spherical adsorbent particles.

It is a further object of the invention to provide a highly effective, and highly efficient adsorption and desorption system to both remove adsorbable components from a fluid stream and recover the adsorbed components from spent adsorbent particles.

Other objects and aspects of the present invention will become apparent to those of skill in the art upon reading the following summary and detailed description.

SUMMARY OF THE INVENTION

The present invention provides adsorber systems for substantially continuous and efficient removal of adsorbable contaminants (for example, but not limited to, VOCs and other organic contaminants, water and other aquepos contaminants, etc.) from air or other fluid streams. The present invention additionally provides desorption systems for substantially continuous and effective desorption, for example, regeneration of spent adsorbent, and recovery of certain contaminants (e.g., VOC's, water, etc.) without the need for interruption of the adsorption/desorption process and without the need to maintain a minimum flowrate of the contaminated fluid stream or the regeneration fluid stream.

In accordance with the present invention, there is provided a moving bed adsorber apparatus which comprises a housing having a fluid inlet through which a fluid stream may pass into the housing, a fluid outlet through which a fluid stream may pass out of the housing, an adsorbent inlet through which a stream of flowable adsorbent material (e.g., small beads of resin) may pass into the housing and an adsorbent outlet through which the adsorbent material may exit the housing. Within the housing there are a series of spaced-apart, downwardly sloping vanes (e.g., louvers). Adsorbent which has entered the housing flows downwardly over the edges of the vanes. Contaminated fluid which enters the housing through the fluid inlet is caused to flow through spaces between the vanes and Then through the adsorbent bed such that a contaminant (e.g., a VOC, water, or other chemical or substance) will be adsorbed onto the adsorbent. An adsorbent depth regulator (e.g., a screen, porous plate, series of vertically disposed baffles, etc.) is positioned a spaced distance away from the edges of the vanes to regulate the thickness of the adsorbent bed as it flows downwardly over the vanes. At least portion(s) of the adsorbent depth regulator is/are porous to allow clean fluid to pass there through. The adsorbent depth regulator may be configured and/or positioned relative to edges of the vanes such that the adsorbent bed is maintained at a desired depth or thickness (eg., a continuous, uniform depth or thickness or prescribed regional variations in depth or thickness). Clean fluid that emerges from the flowing adsorbent bed passes through adsorbent depth regulator and then out of the clean fluid outlet. The spent adsorbent passes out of the adsorbent outlet. The spent adsorbent may be disposed of in any suitable manner or may be transferred to a desorber device where the contaminant may be desorbed from the adsorbent and recovered (e.g., via a heat, drying and/or condensation, or any other suitable process which removes the contaminant from the adsorbent material).

In accordance with the invention, variables such as the angle(s) of the downwardly sloping vanes, the width(s) of the spaces between the vanes, the type and size of the adsorbent particles and the flowrate of the adsorbent bed may be prescribed or adjusted to optimize throughput (e.g., the flowrate of contaminated fluid through the adsorber device) while preventing substantial amounts of the adsorbent material from backing up into the spaces between the vanes. In many applications of the present invention, the spaces between the vanes may be wider than the cross-sectional dimension of the smallest adsorbent particles but no substantial amount of the adsorbent will back feed into the spaces between the vanes due to the downward slope of the vanes relative to the direction at which the adsorbent bed is moving.

Further in accordance with the invention, there is provided a moving bed desorber apparatus that is substantially the same in construction as the moving bed adsorber apparatus summarized in the immediately preceding paragraphs, but wherein spent adsorbent is introduced through the adsorbent inlet, a recovery fluid (e.g., steam or suitable hot gas) is introduced through the fluid inlet, clean adsorbent exits through the adsorbent outlet and fluid containing a desorbed contaminant exits through the fluid outlet. Such clean adsorbent may then be transferred by batch or continuous process to an adsorber apparatus where it may once again be used to recover a desired contaminant from a fluid stream.

The invention for example, the moving bed desorber may comprise, a housing having a recovery fluid inlet, a recovery fluid outlet, an adsorbent inlet and an adsorbent outlet, and a plurality of vanes positioned within the housing such that spaces are defined between the vanes, wherein said plurality of vanes, recovery fluid inlet, recovery fluid outlet, adsorbent inlet and adsorbent outlet being situated and constructed such that a) a stream of recovery fluid stream flows through the spaces between the vanes, b) adsorbent laden with a recoverable material to be recovered flows through a space adjacent to the vanes forming a moving adsorbent bed, such that the recovery fluid will flow from the spaces between the vanes and through the moving adsorbent bed causing at least some of the recoverable material to be desorbed from the adsorbent, c) the adsorbent from which the recoverable material has been desorbed flows out of the adsorbent outlet and d) the recovery fluid combined with the recovered material flows out of the recovery fluid outlet.

Still further in accordance with the invention, there is provided a shell and tube desorber device which generally comprises a shell, a plurality of tubes disposed within the shell, an adsorbent inlet and adsorbent outlet for passing adsorbent through the tubes, a heated fluid inlet and outlet for passing heated fluid through the shell, and a recovered substance outlet for carrying the recovered substance out of the tubes, wherein said desorber device is operable such that a) a heated fluid is passed through the shell, b) an adsorbent laden with a recoverable substance is passed through the tubes such that the adsorbent becomes heated and the recoverable substance becomes desorbed, c) the desorbed recovered substance flows out of the recovered substance outlet and d) the adsorbent from which the recovered substance has been desorbed flows out of the recovered substance outlet.

The invention together with additional features and advantages thereof may be best understood by reference to the following detailed description taken in connection with the accompanying illustrated drawings.

BRIEF DESCRIPTION OF THE DRAWINGS

FIG. 2B is a perspective view of a contaminated fluid inlet assembly of the moving bed adsorber apparatus shown in FIG. 2.

FIG. 2C is a simplified plan view of a slide valve of the moving bed adsorber apparatus shown in FIG. 2 for releasing adsorbent particles.

FIG. 2C' is a view of the slide valve similar to the view shown in FIG. 2C, with the slide valve now being partially closed to flow.

FIG. 2C" is another view of the slide valve similar to the view shown in FIGS. 2C and 2C', with the slide valve now shown being closed to flow of adsorbent particles.

DETAILED DESCRIPTION OF PREFERRED EMBODIMENTS

Set forth herebelow are detailed descriptions of certain embodiments and examples of the moving bed adsorber/desorber apparatus and systems of the present invention.

Figure 1:
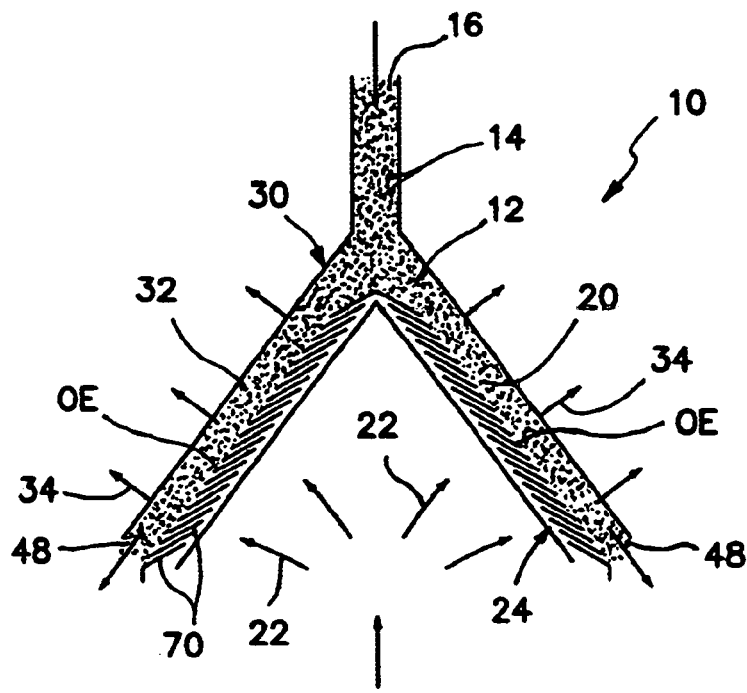
FIG. 1 is a schematic illustration showing a moving bed adsorber apparatus of the present invention being used to remove contaminants from a fluid stream.

Turning now to FIG. 1, a simplified schematic illustration of a moving bed adsorber/desorber apparatus 10 in accordance with the present invention is shown. For the sake of simplicity, the apparatus will hereinafter be primarily described as a moving bed adsorber apparatus, though it will be appreciated by those of ordinary skill in the art that the apparatus, with appropriate modification thereto, may be utilized as a desorber apparatus.

Generally, FIG. 1 shows that the apparatus 10 is structured to form a substantially continuous moving adsorbent bed 12 comprising for example, particles 14 of an adsorbent material. For example, the adsorbent particles may comprise commercially available resin particles, for example, in spherical or granular form. As will be explained in greater detail hereinafter, the moving adsorbent bed 12 provides a highly efficient, highly effective means for processing a fluid, for example a contaminated feed gas having an adsorbable contaminant component therein.

More specifically, the particles 14 of adsorbent, for example clean adsorbent, are received in an adsorbent inlet 16 and are passed into dual passageways 20, which comprises two downwardly sloping passageways 20 preferably having a substantially uniform depth. The apparatus 10 is structured such that adsorbent particles 14 move downwardly along the sloped passageway 20 in a fashion approaching, or at, a plug flow rate. In other words, the adsorbent particles, while in the passageway 20, move, in effect, as unitary mass of adsorbent, preferably without substantial intra-passageway mixing of adsorbent particles 14.

While in the passageway 20, the moving adsorbent bed 12 is contacted by a contaminated fluid to be treated, for example, a feed gas having one or more adsorbable contaminant components, or adsorbable recoverable components, therein.

As shown in simplified form in FIG. 1, the contaminated feed gas, represented by arrows 22, is directed into the moving adsorbent bed 12 by means of a fluid inlet assembly 24. The fluid inlet assembly 24 may define a limit or boundary, for example, a lower boundary, of the passageway 20.

Preferably, the apparatus 10 further comprises a bed thickness regulator 30, comprising for example a porous element 32 which is structured to allow outflow of treated feed gas (represented by arrows 34).

More particularly, the bed thickness regulator 30 is structured to provide an effective means for regulating and maintaining a substantially uniform thickness and continuous flow, preferably at or near plug flow, of the moving adsorbent bed 12. It can be appreciated from FIG. 1 that the porous element 32 may define another boundary, for example an upper boundary, of the passageway 20.

These features of the present invention provides substantial advantages over conventional fixed bed or fluidized bed adsorbent systems. For example, by providing a moving adsorbent bed, moving primarily by force of gravity, and moving substantially at plug flow, the bed depth can be small so the pressure drop is minimized within the adsorbent bed, and allows effective operation of the apparatus 10 over a wide range of flow rates of the feed stream.

In some applications, the apparatus 10 of the present invention provides a highly effective means for processing a high adsorbent mass flow using a relatively low adsorbent inventory, and requiring a low pressure of feed gas. The present apparatus 10 is substantially more effective and efficient in processing fluids having high concentrations of adsorbable contaminants, while requiring substantially less adsorbent than conventional systems.

A specific embodiment of the present invention, and selected components thereof, are shown in FIGS. 2, 2A, 2B, 2C, 2C', and 2C".

Figure 2:
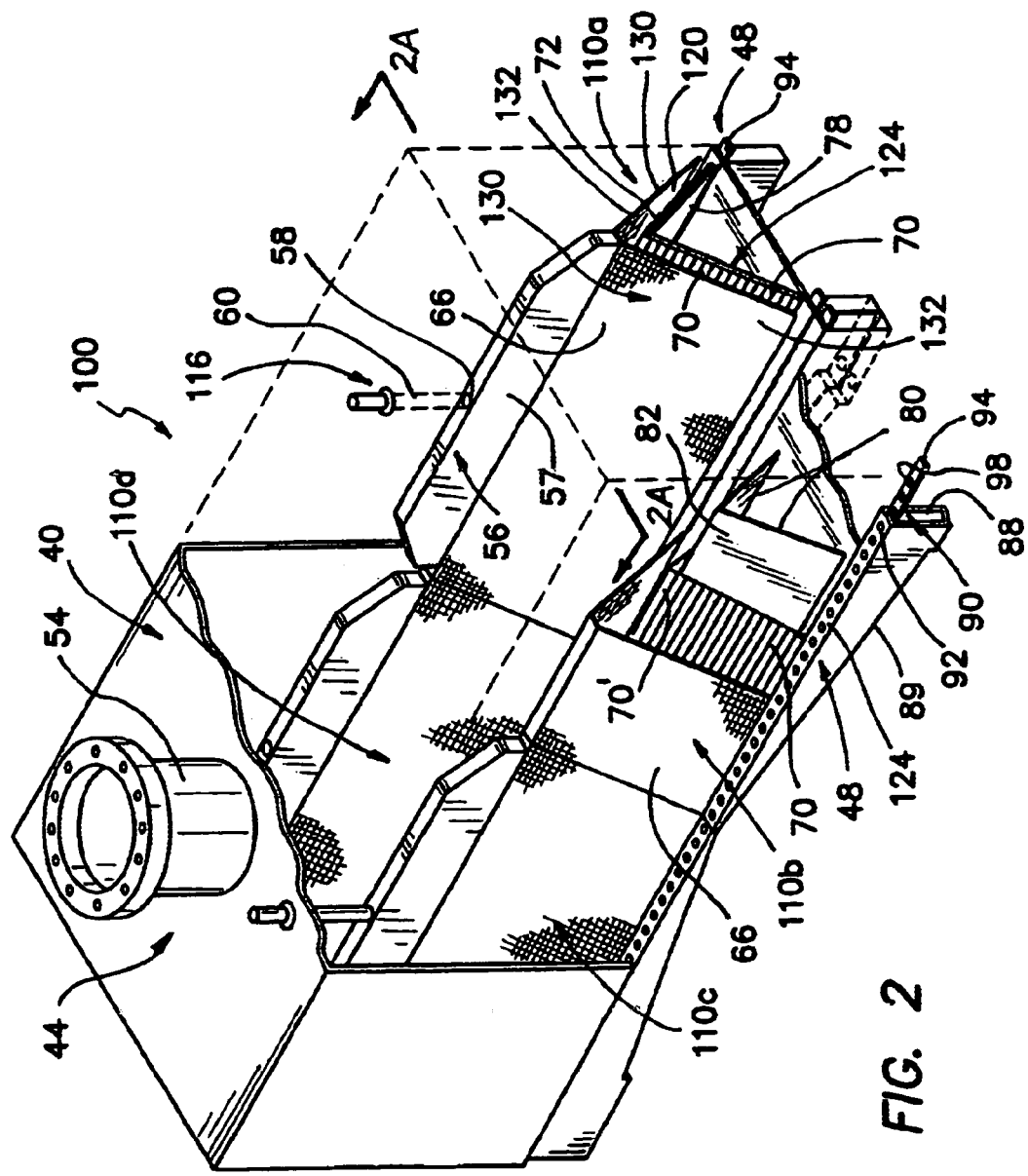
FIG. 2 is a partially cut-away perspective view of a moving bed adsorber apparatus of the present invention.
Figure 2A:
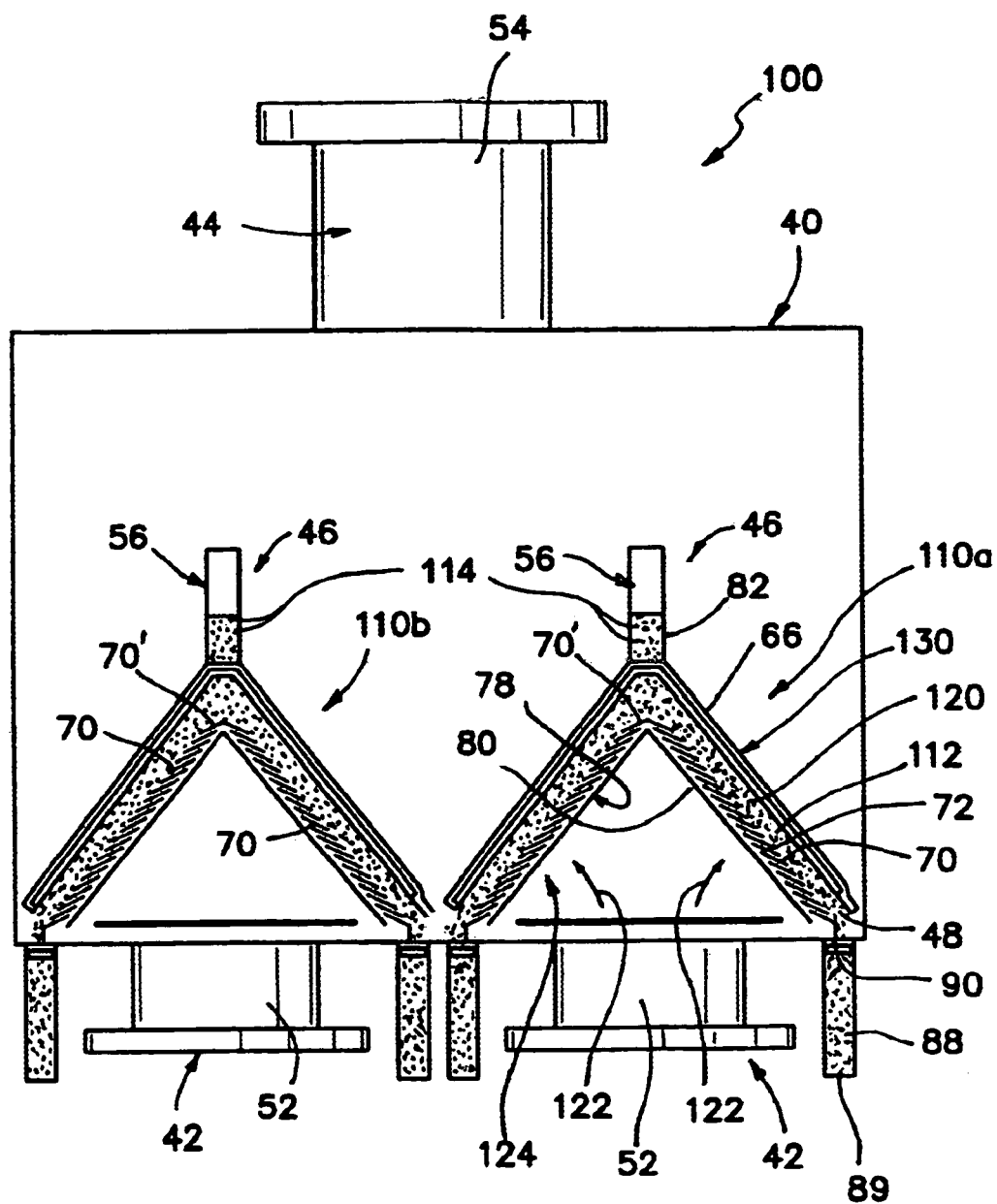
FIG. 2A is a cross sectional view of the moving bed adsorber apparatus of FIG. 2 taken along lines 2A-2A.

Referring now specifically to FIGS. 2 and 2A, in accordance with this specific embodiment of the invention, the present invention provides an adsorption/ desorption unit 100, useful as a component of a larger contaminant removal and for recovery system (not shown in FIG. 2 or 2A). The unit 100 is shown to include four adsorber/desorber apparatus 110a, 110b, 110c, and 110d enclosed within a single housing 40. It is noted that the unit 100 is structured to enable processing of 500 scfm to greater than 4800 scfm of feed gas. Because the unit 100 is preferably designed to be modular, additional similar units in accordance with the present invention, may be included in a larger contaminant removal and/or recovery system, as the application may require.

Unless otherwise indicated, features of apparatus 110a, 110b, 110c and 110d that correspond to features of apparatus 10 are designated by the same reference numerals increased by 100. For example, apparatus 110a is designed and structured to receive a flow of adsorbent through an adsorbent inlet 116, and is structured to facilitate a flow of a moving adsorbent bed 112 (not shown in FIG. 2), maintained at a substantially uniform thickness, within passageway 120.

As shown, the passageway may be defined between a contaminated fluid inlet assembly 124 and bed thickness regulator 130, preferably comprising porous element 132. In addition, it should be appreciated that, for the sake of simplicity, particularly with respect to FIGS. 2 and 2A, apparatuts 110a will be described in detail, while typically each of apparatus 110b, 110c, and 110d will not be described in detail, though it should be understood that apparatus 110b, 110c, and 110d are generally substantially similar or substantially identical to apparatus 110a.

It should also be appreciated that although unit 100 is shown and described to include four apparatus 110a, 110b, 110c, and 110d, less than four, or more than four, such apparatus may be provided in a single adsorber/desorber unit in accordance with the present invention.

Generally, the housing 40 of the unit 100, in accordance with this embodiment of the invention, generally includes a contaminated fluid inlet 42 (not visible in FIG. 2), a clean fluid outlet 44, adsorbent inlet 116, and an adsorbent outlet 48.

More specifically, turning now to FIG. 2A, the contaminated fluid inlet 42 may comprise, for example, up to four or more generally cylindrical inflow tubing ducts 52 that are connectable to, or are otherwise structured to be placed in fluid communication with, a source of fluid to be treated (for example, a contaminated gas). Similarly, referring back now as well to FIG. 2, the clean fluid outlet 44 may comprise, for example, up to two or more generally cylindrical outflow tubing ducts 54 that provide a means for venting treated fluid into the atmosphere, or alternatively, into another treatment unit, for example for additional processing.

Passageway 120 is fed a supply of adsorbent particles 114 by means of adsorbent inlet 116. The adsorbent inlet 116 preferably includes an adsorbent feeder assembly 56, comprising a substantially hollow, elongated feeder housing 57 having an aperture 58 for receiving a flow of adsorbent, for example resin particles. The feeder assembly 56 may extend at least a portion of a length of the apparatus 110a, such as shown most clearly in FIG. 2. The aperture 58 is structured to be connectable to a source of clean resin particles, for example, by means of conduit 60 extending through housing 40.

Turning now as well to FIG. 2B, a preferred structure of the contaminated fluid inlet assembly 124 is shown. The fluid inlet assembly 124 preferably forms an outwardly angled, inverted, generally V-shaped structure comprising a series of spaced-apart vanes 70, designed for directing a fluid flow, for example a contaminated gas flow, into the passageway 120 of the apparatus 110a in a manner that optimizes contact of the gas with particles of adsorbent. The angle between the adsorbent flow channels that form such generally V-shaped fluid inlet assembly 124 may be in the range of 20-90 degrees and in some embodiments in the range of 20-60 degrees.

In the embodiment shown, the adsorbent flow channel or passageway 120 for accommodating the moving adsorbent bed 112 is comprised of a downwardly sloping space having a substantially uniform depth, defined between an upper surface of the fluid inlet assembly 124 (i.e., the outer edges of the vanes 70) and the bed thickness regulator 130. The bed thickness regulator 130 preferably comprises porous element 132, for example a flat screen 66 (e.g., flat stainless steel screen available from Sohnson Screen, 6022 State Road, Bakersfield, Calif.), a sheet of perforated or sintered metal or plastic, layer of woven fabric or cloth, netting or any other suitable structure that can maintain the constant depth of the moving adsorbent bed while being sufficiently permeable to allow passage therethrough of the feed fluid. Such porous element 132 is, however, substantially impermeable to at least a majority of, and preferably all of, the adsorbent particles flowing within the passageway 120. In other words, in applications where particular adsorbent material is used, the porous element 132 preferably includes pores, openings, or interstices, that are smaller than an average size of the adsorbent particles.

Preferably, referring now as well to FIG. 2A, the fluid inlet assembly 124 comprises a plurality of spaced apart vanes 70, preferably disposed in a layered fashion, defining spaces 72 between the vanes 70 for directing fluid flow into the passageway 120, preferably in a non-vertical direction. The vanes 70 are preferably affixed to one another at ends thereof, or in any suitable manner that will facilitate securing of the vanes in the spaced apart, overlapping desired position. A top vane 70' may be provided, comprising for example, a flat sheet of rigid material (for example, stainless steel) bent at its midpoint to form an angle. The remaining vanes 70 are positioned below the top vane 70' and may comprise flat strips of rigid material (for example, stainless steel) affixed at spaced apart, downwardly angled positions beneath the top vane 70'. In this manner, exposed portions of the upper surfaces of the vanes 70 generally form downwardly sloped surfaces on either side of the top vane 70', defining a lower surface of the passageway 120.

Preferably, the spaces 72 and vanes 70 are disposed in a non-vertical orientation, and more preferably in a downwardly angled orientation in the ranges of 10-45 degrees, or in some embodiments in the range of 15-30 degrees, as shown. Therefore, feed fluid directed into the apparatus (for example, in the direction of arrows 122 in FIG. 2A) will be pass into the passageway 120, which is filled with the moving adsorbent bed 112, in a generally downward direction, maximizing contact of feed fluid with adsorbent.

In addition to optimizing contact between inflowing gas and the moving adsorbent bed 112, this non-vertically oriented vane structure functions to substantially prevent any adsorbent particles from entering the spaces 72.

The fluid inlet assembly 124 may further comprise a frame 78 for securing the vanes 70 in the appropriate position. The frame 78 may comprise a bracket assembly extending along a perimeter of the fluid inlet assembly 124, or alternatively, porous panels 80 connected at an apex 82 of the fluid inlet assembly 124. The frame 78 may comprise any suitable structure for accommodating the plurality of vanes 70 in the substantially downwardly sloped arrangement.

It can be appreciated that, in this particular embodiment of the invention, the passageway 120 comprises, in effect, two passageways 120, fed by a single, vertically disposed adsorbent inflow passage 82, wherein each passageway 120 has a substantially uniform depth, and each has a slope generally conforming to the slope defined by the upper surface of the fluid inlet assembly 124.

FIG. 2A also shows a preferred structure of the adsorbent outlet 48 for passing the moving adsorbent bed 112 out of the passageway 120, to be discarded, or more preferably, cleaned and recycled back to the unit 100.

For example, the adsorbent outlet 48 may comprise a collection chamber 88 that is structured, for example, by means of a sloped floor 89 (seen more clearly in FIG. 2), to direct flowing adsorbent particles toward front and rear portions of the unit 100, to be collected and preferably circulated to a desorber (not shown in FIG. 2 or FIG. 2A) for recovering the adsorbed components thereon, such that the adsorbent may be reused.

In addition, the adsorbent outlet 48 further comprises a mechanism, for example a valve 90, structured to regulate the rate of adsorbent flow, for example, the rate of motion of the moving adsorbent bed 112 through the passageway 120.

The valve 90 may comprise a slide valve 90, disposed above the collection chamber 88 for enabling a controllable rate of flow of the adsorbent mass (moving adsorbent bed) through the passageway 120. For example, referring now to FIGS. 2C, 2C' and 2C", the slide valve 90 may comprise a stationary member 92 and a corresponding sliding member 94, each including apertures 96 and 98, respectively, disposed at suitable intervals along the members 92 and 94.

The apertures 96 and 98 are preferably sized and positioned to enable an open flow (for example, at a maximum outflow rate) of adsorbent particles when the apertures 96 and 98 are in line with one another, such as shown in FIG. 2C, a relatively slow flow (for example a flow rate at a less than maximum outflow rate) of adsorbent particles when the apertures 96 and 98 are offset from one another, such as shown in FIG. 2C', and a closed-to-flow of adsorbent particles, when the apertures 96 and 98 are entirely, or effectively entirely, offset from one another such as shown in FIG. 2C".

The apertures 96 and 98 may be between about 0.75 inches and about 1.5 inches in diameter, and are preferably equally spaced apart at intervals of between about 2.0 inches and about 4.0 inches. Alternatively, the apertures 96 and 98 may be any other size and/or spacing determined to be suitable for accommodating the resin particles to be used in the unit 100.

The slide valve 90 may be controlled by any suitable, conventional means, for example, electronically or mechanically, for example, by means of an actuator and/or stepper motor.

Advantageously, the structure of the present invention as hereinabove described and shown herein, provides a moving bed adsorber apparatus that causes relatively low mechanical abrasion of adsorbent resin particles, and thus will have a relatively low resin attrition. The moving adsorbent bed 112 moves under force of gravity, with no substantial mixing between particles within the bed, therefore the particles tend to maintain their structural integrity longer than resin particles that are subjected to conventional fluidized systems. In addition, the structure of the present invention enables use of resin particles of various sizes and shapes, and does not require the use of spherical particles, such as is typically required of conventional fluidized systems.

Figure 3:
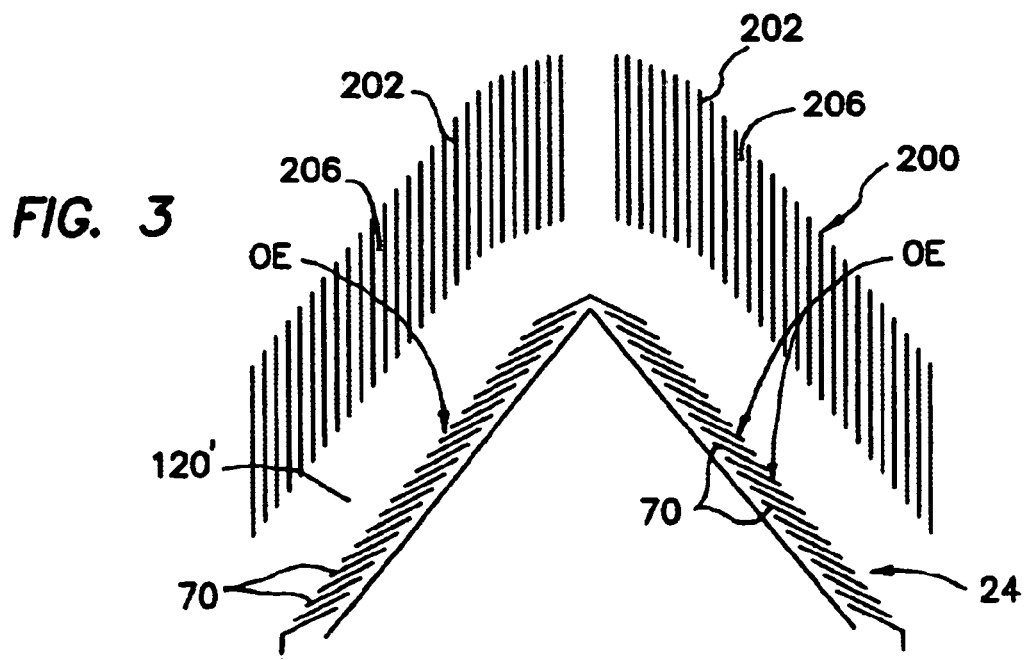
FIG. 3 shows a schematic illustration of an alternative embodiment of the moving bed adsorber apparatus of the present invention.

Turning now to FIG. 3, an alternative adsorbent bed thickness regulator 200 is shown as disposed above and spaced apart from the contaminated fluid inlet assembly 24. Like the bed thickness regulator 30 and 130 described elsewhere herein, bed thickness regulator 200 is positioned within the housing (not shown in FIG. 3) and is structured to regulate or maintain the thickness of the moving bed or mass of adsorbent within a substantially uniform passageway 120'. However, rather than the flat porous element 32, the bed thickness regulator 200 comprises a series of vertically disposed baffles 202, preferably spaced apart from one another a sufficient distance that will prevent resin particles from entering spaces 206 between the baffles 202. It is to be appreciated that any other suitable structure or apparatus, such as baffle(s), screen(s), doctor blade(s) and the like, may be provided as a means of regulating and maintaining the thickness of the moving adsorbent bed.

Preferably, after the adsorbent laden with contaminant (e.g., "spent resin") flows out of the adsorbent outlets 48, it may be subjected to a desorption process whereby the contaminant (e.g., a VOC, water, other adsorbable substance) is desorbed from the adsorbent, thereby recharging or cleaning the adsorbent for routine disposal or reuse. In cases where the desorbed contaminant is to be recovered, such desorbed contaminant may then be subjected to secondary processes whereby it is cleaned, filtered, concentrated, distilled, condensed, etc.

Figure 4:
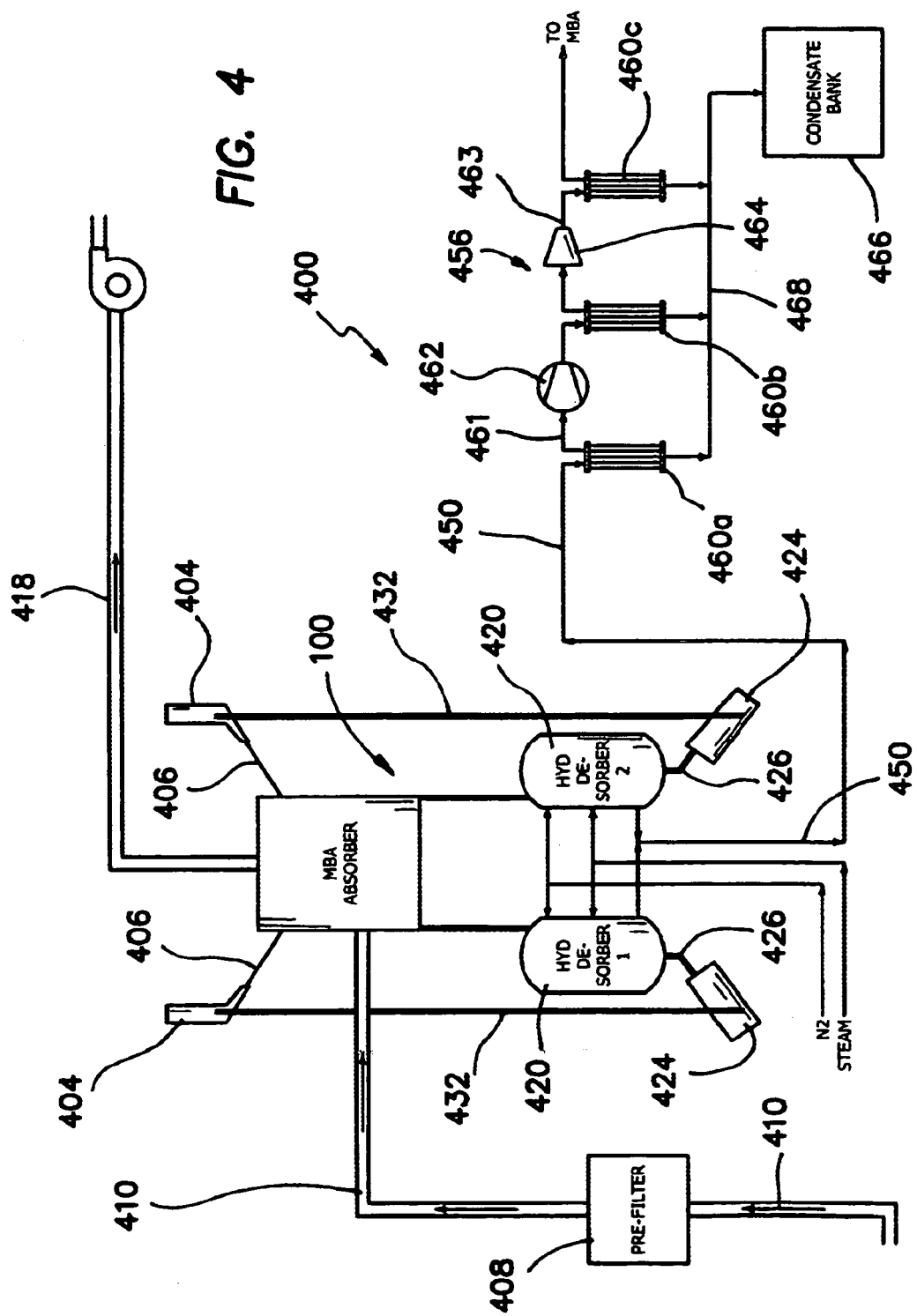
FIG. 4 shows a schematic representation of an adsorber/desorber system of the present invention.

FIG. 4 shows a contaminated fluid treatment and recovery system 400, in accordance with the present invention, the system 400 incorporating the moving bed adsorber unit 100 as a useful component thereof. A specific example of such a system 400 will now be described, though the details of which are not to be considered limiting the scope of the invention. For example, the system 400 may be used for removal of hexane from an off-gas and subsequent recovery thereof, at an agricultural plant for example.

The system 400 is shown to include a pair of adsorbent supply hoppers 404 for providing clean adsorbent particles, for example beads of a polymer resin that will adsorb hexane (e.g., Octipore 503 resin, Dow Chemical Company, Midland Mich.). The adsorbent is passed, for example, under force of gravity, to the moving bed adsorber unit 100 by means of conduits 406. A stream of fluid to be treated, for example a stream of gases having hexane and/or other adsorbable contaminants therein, is passed through a prefilter 408, by means of conduit 410, and into the moving bed adsorber 100 for processing as substantially described elsewhere herein.

The treated gas, having the contaminant component substantially removed therefrom, is vented Through line 418 into the atmosphere (or alternatively, to another adsorber unit 100 for additional treatment). In this example, the bed thickness regulator 30 includes a porous element 32 that has pores or openings, which are small enough to prevent the adsorbent beads from escaping therethrough. In this particular example wherein the Dow Octipore 503 resin is being used to recover hexane, the porous element may be a stainless steel screen having openings of approximately 0.016 inch or any other Size that is small enough to preclude passage therethrough of substantial numbers of the adsorbent beads. In many applications, screen having openings of up to approximately 0.25 inch or larger may be acceptable, depending on the corresponding size of the adsorbent particles being used.

The spent adsorbent particles may be disposed or, more typically, will be passed into desorbers 420 for removal of the adsorbed hexane from the resin particles. The "clean" resin particles are then passed to containers 424 by means of conduits 426, and then are conveyed, for example by an Archimedes screw mechanism 432 or other means, back to the supply hoppers 404.

The contaminant (in this example, hexane) in the desorbers is passed as a vapor by means of a conduit 450 to a condensor assembly 456, comprising multiple condensers 460a, 460b and 460c, arranged in stages as shown, for optimizing recovery of the hexane from the vapor. For example, the first condenser 460a may be connected to the second condenser 460b by line 461 including vacuum pump 462. The second condenser 460b, may be connected to the third condenser 460c by line 463 including compressor 464.

All three condensers 460a, 460b and 460c are connected to condensate tank 466 by line 468. Other suitable arrangements for recovering hexane from vapor may be included in the present invention.

The recovered hexane, in condensate form, is held in the condensate tank 466, and the off-gas from the condenser assembly 456 may be passed to another adsorber assembly in accordance with the invention, for additional treatment, or may be vented to the atmosphere.

Figure 6:
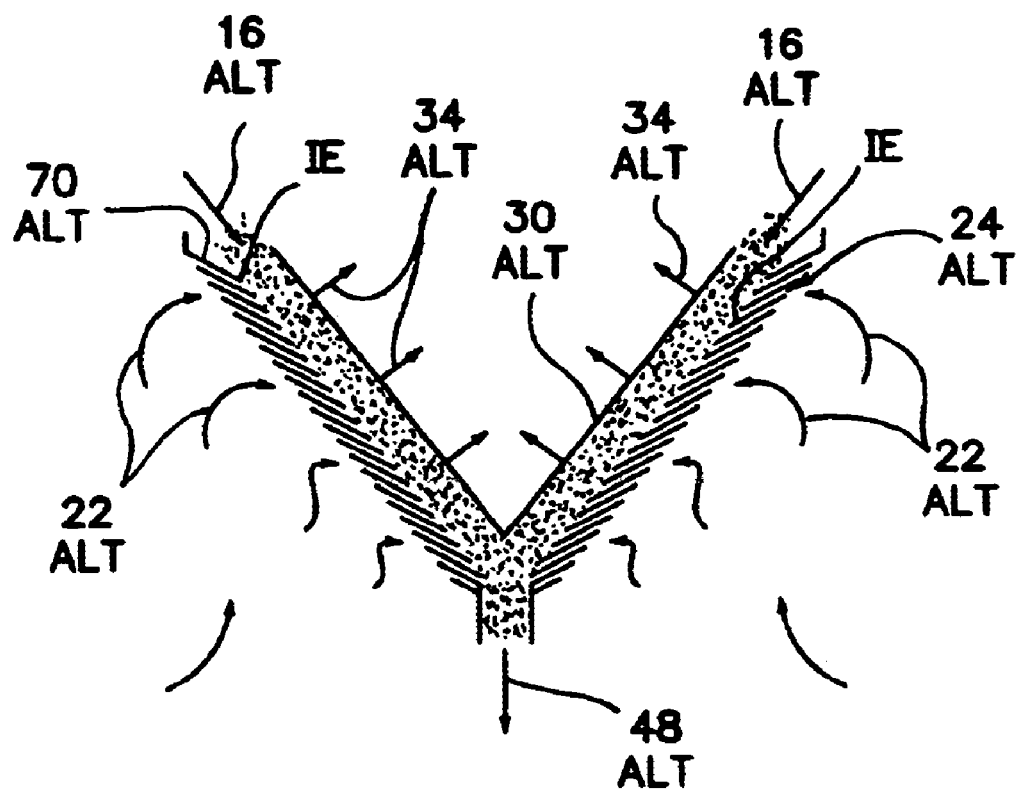
FIG. 6 is a partially cut-away perspective view of an alternative configuration for a moving bed desorber apparatus of the present invention

Turning back now briefly to FIG. 1, those of skill in the art will appreciate that the moving bed adsorber apparatus 10 of this invention may also be used as a moving bed desorber. In such desorber applications, spent resin will enter the apparatus 10 through adsorbent inlet 16, and clean resin will exit the apparatus 10 at the adsorbent outlets 48. Also, in such desorber applications, a recovery fluid (for example, hot air or steam) will flow into the apparatus 10 through the fluid inlet assembly 24 (in direction of arrows 22) and recovery fluid laden with the desorbed contaminant will exit the apparatus 10 in the direction of arrows 34. Alternatively, as shown schematically in FIG. 6, in at least same applications of the moving bed desorber, the fluid inlet assembly $24_{alt}$ may be inverted from that shown in FIG. 1, such that the vanes $70_{alt}$ an slope downwardly toward the interior of the device and the adsorbent flow channels defined between the inner edges IE of the vanes $70_{alt}$ and the porous bed thickness regulator $30_{alt}$ are generally in a "V" configuration. The spent adsorbent enters in two streams at the top of the device as indicated by arrows $16_{alt}$ and flows downward between the inner edges IE of the vanes $70_{alt}$ and the bed thickness regulator 30, exiting through a single adsorbent outlet Indicated by arrow $48_{alt}$. The recovery fluid enters the interior of the housing, passes through the spaces between the vanes $70_{alt}$ as indicated by arrows $22_{alt}$, passes through the adsorbent so as to desorb the contaminant or other adsorbed substance from the adsorbent and the recovery fluid containing the recovered (i.e., desorbed) contaminant or substance then passes through the porous bed thickness regulator $30_{alt}$ as indicated by arrows $34_{alt}$.

Figure 5:
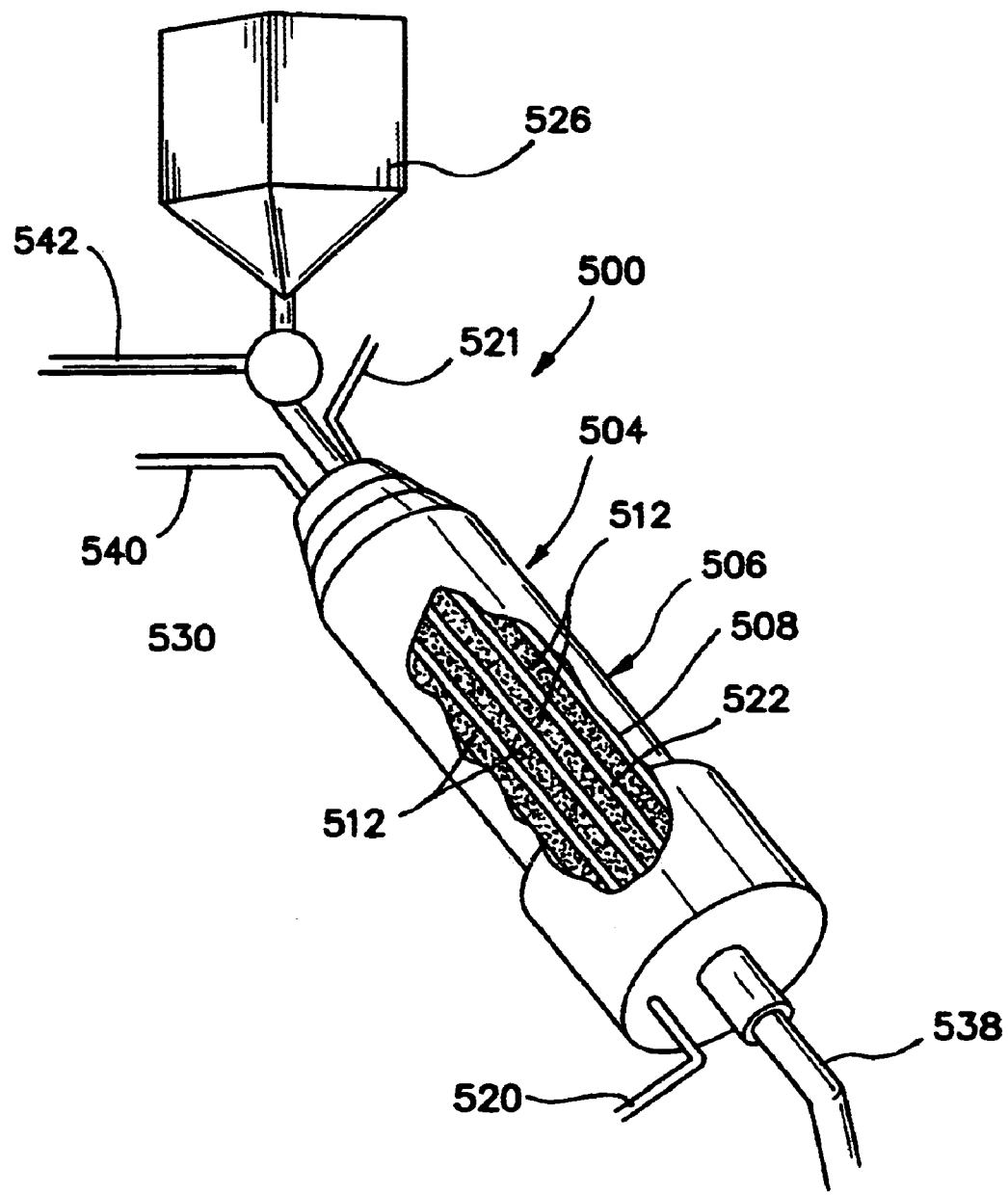
FIG. 5 shows a partially cut-away perspective view of one embodiment of a desorber of the present invention.

Another type of desorber apparatus 500 in accordance with the present invention is the Low Flow (High Yield) desorber apparatus shown in FIG. 5. This desorber apparatus 500 is particularly suitable for recovery of volatile compounds such as VOC's or other contaminants that may be desorbed by heating the contaminant-laden adsorbent. This desorber apparatus 500 generally comprises an assembly 504 including a shell 506 and at least one tube 508, preferably a plurality of tubes 508, for containing an adsorbent 512 (for example, spent resin particles) therein.

A recovery fluid, for example steam or other elevated temperature medium is passed into the shell 506, for example through inlet 520 and out outlet 521, and is allowed to flow within spaces 522 defined between the tubes 508.

Spent resin to be treated flows from a hopper 526 through a manifold (not shown) and into the plurality of tubes 508 within the shell 506. The tubes 508 may be sealed and a vacuum applied thereto during the desorption process. The adsorbent 512 in the tubes 508 is heated by the hot medium flowing through the shell 506. In this manner the contaminant, for example, hexane, is desorbed from the adsorbent 512 and is caused to vaporize.

A clean adsorbent outlet line 538 connected to the tubes 508 is opened and the cleaned adsorbent 512 is allowed to exit the assembly 504 for reuse. The contaminant vapor is allowed to flow out of the tubes 508 through outlet 540 and may be carried by a line or lines to a condenser and/or other secondary processing area.

Preferably, the assembly 504 is disposed at an angle of between about 30 degrees to about 60 degrees, more preferably at about 45 degrees, from the horizontal. In addition, a vacuum source may be connected to the tubes 508 for example at line 542 in order to maintain a vacuum, preferably a deep vacuum within the tubes 508, for example a vacuum measuring between about 10 to 100 Torr. The deep vacuum allows more rapid desorption at a lower heat requirement.

While all aspects of the present invention have been described with reference to the aforementioned applications, this description of various embodiments and methods shall not be construed in a limiting sense. The aforementioned is presented for purposes of illustration and description. It should be understood that all aspects of the invention are not limited to the specific depictions, configurations or relative proportions set forth herein which depend upon a variety of conditions and variables. The specification is not intended to be exhaustive or to limit the invention to the precise forms disclosed herein. Various modifications and insubstantial changes in form and detail of the particular embodiments of the disclosed invention, as well as other variations of the invention, will be apparent to a person skilled in the art upon reference to the present disclosure. It is Therefore contemplated that the appended claims shall cover any such modifications, or variations of the described embodiments as falling within the true spirit and scope of the invention.

What is claimed is:

1. A moving bed adsorber apparatus comprising:
    a housing having a fluid inlet, a fluid outlet, an adsorbent inlet and an adsorbent outlet;
    a plurality of spaced-apart, downwardly sloped vane members having edges, said vane members being positioned within the housing such that contaminated fluid that enters through the fluid inlet will subsequently flow through spaces between said vane members; and,
    an adsorbent depth regulator positioned a spaced distance from the edges of the vane members and defining an adsorbent flow channel there between, at least a portion of said adsorbent depth regulator being porous to fluid flow;
    such that, a flow of adsorbent may pass through the adsorbent inlet, through the adsorbent flow channel, then out of the adsorbent outlet and, concurrently, a flow of contaminated fluid may pass through the fluid inlet, through spaces between the vane members and through adsorbent moving through the adsorbent flow channel, thereby causing contaminant to be adsorbed on to the adsorbent, and a remaining fluid from which the contaminant has been removed then flowing through the adsorbent depth regulator and out of the fluid outlet;
    wherein the vane members are spaced approximately 5-25 mm apart.

2. A moving bed adsorber apparatus according to claim 1 wherein the spaces between the vane members are large enough to permit adsorbent to pass there through but the downward slope of the vane members is sufficient to prevent any substantial amount of adsorbent from entering the spaces between the vane members.

3. A moving bed adsorber apparatus according to claim 1 wherein the vane members are sloped downwardly at angles of approximately 10-45 degrees.

4. A moving bed adsorber apparatus according to claim 3 wherein the vane members are sloped downwardly at angles of approximately 15-30 degrees.

5. A moving bed adsorber apparatus according to claim 1 wherein the vane members and the adsorbent depth regulator are configured and positioned so as to define at least two adsorbent flow channels.

6. A moving bed adsorber apparatus according to claim 5 wherein said at least two adsorbent flow channels are configured and positioned to generally form a "V".

7. A moving bed adsorber apparatus according to claim 6 wherein said at least two adsorbent flow channels are configured and positioned to generally form a substantially inverted "V."

8. A moving bed adsorber apparatus according to claim 6 wherein said at least two adsorbent flow channels are configured and positioned to generally form a substantially non-inverted "V".

9. A moving bed adsorber apparatus according to claim 6 wherein the angle between said at least two adsorbent flow channels generally forming the "V" shape is approximately 20-90 degrees.

10. A moving bed adsorber apparatus according to claim 6 wherein the angle between said at least two adsorbent flow channels generally forming the "V" shape is approximately 20-60 degrees.

11. A moving bed adsorber apparatus according to claim 5 further comprising an adsorbent flow splitter for dividing the incoming flow of adsorbent such that adsorbent will flow through each of said adsorbent flow channel.

12. A moving bed adsorber apparatus according to claim 1 wherein the adsorbent depth regulator comprises a screen.

13. A moving bed adsorber apparatus according to claim 1 wherein the adsorbent depth regulator comprises a series of spaced-apart baffles.

14. A moving bed adsorber apparatus according to claim 1 further in combination with a quantity of adsorbent that is passable through the adsorbent flow channel, wherein the adsorbent depth regulator Is constructed such that fluid that has passed through the adsorbent may pass through the adsorbent depth regulator but substantial amounts of adsorbent will not pass through the adsorbent depth regulator.

15. A moving bed adsorber apparatus according to claim 1 wherein the adsorbent flow channel has a substantially uniform width.

16. A moving bed adsorber apparatus according to claim 1 wherein adsorbent flows through the adsorbent flow channel substantially at plug flow.

17. A moving bed desorber apparatus comprising:
a housing having a recovery fluid inlet, a recovery fluid outlet, an adsorbent inlet, and an adsorbent outlet;
a plurality of spaced-apart, downwardly sloped vane members having edges, said vane members being positioned within the housing such that recovery fluid that enters through the fiuid inlet will subsequently flow through spaces between said vane members; and,
an adsorbent depth regulator positioned a spaced distance from the edges of the vane members and defining an adsorbent flow channel there between, at least a portion of said adsorbent depth regulator being porous to fluid flow;
such that, a flow of adsorbent may pass through the contaminated adsorbent inlet through the adsorbent flow channel and out of the clean adsorbent outlet and, concurrently, a flow of recovery fluid may pass through the fluid inlet, through spaces between the vane members and through contaminated adsorbent as it moves through the adsorbent flow channel, thereby causing contaminant to be desorbed from the adsorbent and carried by the recovery fluid out of the recovery fluid outlet;
wherein the vane members are spaced approximately 5-25 mm apart.

18. A moving bed desorber apparatus according to claim 17 wherein the spaces between the vane members are large enough to permit adsorbent to pass therethrough but the downward slope of the vane members is sufficient to prevent any substantial amount of adsorbent from entering the spaces between the vane members.

19. A moving bed desorber apparatus according to claim 17 wherein the vane members are sloped downwardly at angles of approximately 10-45 degrees.

20. A moving bed desorber apparatus according to claim 17 wherein the vane members are sloped downwardly at angles of approximately 15-30 degrees.

21. A moving bed desorber apparatus according to claim 17 wherein the vane members and the adsorbent depth regulator are configured and positioned so as to define at least two adsorbent flow channels.

22. A moving bed desorber apparatus according to claim 21 wherein said at least two adsorbent flow channels are configured and positioned to generally form a "V."

23. A moving bed desorber apparatus according to claim 22 wherein said at least two adsorbent flow channels are configured and positioned to generally form a substantially inverted "V."

24. A moving bed desorber apparatus according to claim 22 wherein said at least two adsorbent flow channels are configured and positioned to generally form a substantially non-inverted "V".

25. A moving bed desorber apparatus according to claim 22 wherein the angle between said at least two adsorbent flow channels generally forming the "V" shape is approximately 20-90 degrees.

26. A moving bed desorber apparatus according to claim 22 wherein the angle between said at least two adsorbent flow channels generally forming the "V" shape is approximately 20-45 degrees.

27. A moving bed desorber apparatus according to claim 21 further comprising an adsorbent flow splitter for dividing the incoming flow of adsorbent such that adsorbent will flow through each adsorbent flow channel.

28. A moving bed desorber apparatus according to claim 17 wherein the adsorbent depth regulator comprises a screen.

29. A moving bed desorber apparatus according to claim 17 wherein the adsorbent depth regulator comprises a series of spaced apart baffles.

30. A moving bed desorber apparatus according to claim 17 further in combination with a quantity of adsorbent that is passable through the adsorbent flow channel, wherein the adsorbent depth regulator is constructed such that fluid that has passed through the adsorbent may pass through the adsorbent depth regulator but substantial amounts of the adsorbent will not pass through the adsorbent depth regulator.

31. A moving bed desorber apparatus according to claim 17 wherein the adsorbent flow channel has a substantially uniform width.

32. A moving bed desorber apparatus according to claim 17 wherein adsorbent flows through the adsorbent flow channel substantially at plug flow.

33. A desorber apparatus comprising:
a shell having an interior chamber there within, a heated fluid inlet and a heated fluid outlet;
a plurality of tubes having outer surfaces, said tubes being disposed within the interior chamber of the shell such that adsorbent may flow through said tubes while heated fluid contacts the outer surfaces of the tubes, thereby heating the adsorbent as it passes through the tubes and causing desorption of contaminant from the adsorbent; and a recovered substance outlet through which the desorbed contaminant may pass out of the tubes;

wherein the shell and tubes are positioned at an angle of between about 30 degrees and about 60 degrees from a horizontal, during use of the apparatus.

34. A desorber apparatus according to claim 33 further comprising a vacuum source applied to the tubes to enhance desorption of contaminant from the adsorbent flowing through the tubes.

35. A desorber apparatus according to claim 33 wherein the apparatus is adapted for operation in a batch mode.

36. A desorber apparatus according to claim 33 wherein the apparatus is adapted for operation in a continuous mode.

37. A method for removing an adsorbable substance from a fluid stream, said method comprising the steps of:
(A) providing a moving bed adsorber apparatus that comprises i) a housing, and ii) at least one adsorbent flow channel located adjacent to a plurality of spaced-apart, downwardly sloped vane members, said vane members having edges, said vane members being positioned within the housing such that fluid may flow through spaces between said vane members and through adsorbent material that is flowing through said adsorbent flow channel;
(B) causing adsorbent to flow through said at least one adsorbent flow channel; and,
(C) causing a fluid stream containing the adsorbable substance to flow through spaces between the vane members and Through adsorbent material flowing through the at least one adsorbent flow channel such that at least some of the adsorbable substance is adsorbed by the adsorbent material;
(D) desorbing the adsorbable substance from the adsorbent material by a process selected from the group consisting of; i) a batch desorption process and ii) a substantially continuous desorption process.

38. A method according to claim 37 wherein the apparatus provided in Step A further comprises an adsorbent depth regulator positioned a spaced distance from the edges of the vane members, such that said at least one adsorbent flow channel is defined between the edges of the vane members and the adsorbent depth regulator, wherein at least a portion of said adsorbent depth regulator is porous to fluid flow; and
wherein Step C comprises causing a fluid stream containing the adsorbable substance to flow through the spaces between the vane members and through adsorbent flowing trough the at least one adsorbent flow channel between edges of the vane members and the adsorbent depth regulator such that at least some of the adsorbable substance is adsorbed by the adsorbent material and a substantial amount of the fluid from which the adsorbable substance has been removed then passes through the adsorbent depth regulator.

39. A method according to claim 37 wherein the adsorbent material comprises particles of adsorbent resin.

40. A method according to claim 37 wherein the adsorbable substance comprises a volatile organic compound.

41. A method according to claim 40 wherein the volatile organic compound comprises hexane.

42. A method according to claim 37 wherein the adsorbable substance comprises water.

43. A method according to claim 37 wherein the adsorbable substance becomes a gas or vapor when heated and wherein Step D comprises heating the adsorbent material to cause the adsorbable material to vaporize or become gaseous.

44. A method according to claim 37 further comprising the step of:
(E) recovering the adsorbable substance after it has been desorbed from the adsorbent material.

45. A method according to claim 37 wherein Step D is carried out using a shell and tube type desorber.

46. A method according to claim 37 wherein at least a partial vacuum is applied to the adsorbent material during at least a portion of the desorption process.

47. A method according to claim 45 further comprising the step of positioning at least some of the tubes of the desorber on angle(s) of about 30 degrees to about 60 degrees from horizontal.

48. A method according to claim 37 wherein Step D is carried out using a moving bed desorber which comprises i) a housing and ii) at least one adsorbent flow channel located adjacent to a plurality of spaced-apart, downwardly sloped vane members, said vane members having edges, said vane members being positioned within the housing such that a recovery fluid may flow through spaces between said vane members and through adsorbent material that is flowing through said adsorbent flow channel whereon said adsorbable substance has been adsorbed, said recovery fluid being effective to desorb at least some of the adsorbable substance from the adsorbent material passing through said adsorbent flow channel.

49. A moving bed adsorber apparatus comprising:
a housing having a fluid inlet, a fluid outlet, an adsorbent inlet and an adsorbent outlet;
a plurality of spaced-apart, downwardly sloped vane members having edges, said vane members being positioned within the housing such that contaminated fluid that enters through the fluid inlet will subsequently flow through spaces between said vane members; and,
an adsorbent depth regulator positioned a spaced distance from the edges of the vane members, the vane members and the adsorbent depth regulator being configured and positioned so as to define at least two adsorbent flow channels them between, at least a portion of said adsorbent depth regulator being porous to fluid flow;
such that, a flow of adsorbent may pass through the adsorbent inlet, through the adsorbent flow channels, then out of the adsorbent outlet and, concurrently, a flow of contaminated fluid may pass through the fluid inlet, through spaces between the vane members and through adsorbent moving through the adsorbent flow channels, thereby causing contaminant to be adsorbed on to the adsorbent, and a remaining fluid from which the contaminant has been removed then flowing through the adsorbent depth regulator and out of the fluid outlet.

50. A moving bed adsorber apparatus according to claim 49 wherein the vane members are spaced approximately 5-25 mm apart.

51. A moving bed adsorber apparatus according to claim 49 wherein the spaces between the vane members are large enough to permit adsorbent to pass there through but the downward slope of the vane members is sufficient to prevent any substantial amount of adsorbent from entering the spaces between the vane members.

52. A moving bed adsorber apparatus according to claim 49 wherein the vane members are sloped downwardly at angles of approximately 10-45 degrees.

53. A moving bed adsorber apparatus according to claim 52 wherein the vane members are sloped downwardly at angles of approximately 15-30 degrees.

54. A moving bed adsorber apparatus according to claim 49 wherein said at least two adsorbent flow channels are configured and positioned to generally form a "V."

55. A moving bed adsorber apparatus according to claim 54 wherein said at least two adsorbent flow channels are configured and positioned to generally form a substantially inverted "V.

56. A moving bed adsorber apparatus according to claim 54 wherein said at least two adsorbent flow channels are configured and positioned to generally form a substantially non-inverted "V".

57. A moving bed adsorber apparatus according to claim 54 wherein the angle between said at least two adsorbent flow channels generally forming the "V" shape is approximately 20-90 degrees.

58. A moving bed adsorber apparatus according to claim 54 wherein the angle between said at least two adsorbent flow channels generally forming the "V" shape is approximately 20-60 degrees.

59. A moving bed adsorber apparatus according to claim 49 further comprising an adsorbent flow splitter for dividing the incoming flow of adsorbent such that adsorbent will flow through each adsorbent flow channel.

60. A moving bed adsorber apparatus according to claim 49 wherein the adsorbent depth regulator comprises a screen.

61. A moving bed adsorber apparatus according to claim 49 wherein the adsorbent depth regulator comprises a series of spaced-apart baffles.

62. A moving bed adsorber apparatus according to claim 49 further in combination with a quantity of adsorbent that is passable through said at least two adsorbent flow channels, wherein the adsorbent depth regulator is constructed such that fluid that has passed through the adsorbent may pass through the adsorbent depth regulator but substantial amounts of adsorbent will not pass through the adsorbent depth regulator.

63. A moving bed adsorber apparatus according to claim 49 wherein said at least two adsorbent flow channels have substantially uniform widths.

64. A moving bed adsorber apparatus according to claim 49 wherein adsorbent flows through said at least two adsorbent flow channels substantially at plug flow.

65. A moving bed desorber apparatus comprising:
a housing having a recovery fluid inlet, a recovery fluid outlet, an adsorbent inlet and an adsorbent outlet;
a plurality of spaced-apart, downwardly sloped vane members having edges, said vane members being positioned within the housing such that recovery fluid that enters through the fluid inlet will subsequently flow through spaces between said vane members; and,
an adsorbent depth regulator positioned a spaced distance from the edges of the vane members, said vane members and said adsorbent depth regulator being configured so as to define at least two adsorbent flow channels therebetween, at least a portion of said adsorbent depth regulator being porous to fluid flow;
such that, a flow of adsorbent may pass through the contaminated adsorbent inlet, through the adsorbent flow channels and out of the clean adsorbent outlet and concurrently, a flow of recovery fluid may pass through the fluid inlet, through spaces between the vane members and through contaminated adsorbent as it moves through the adsorbent flow channels, thereby causing contaminant to be desorbed from the adsorbent and carried by the recovery fluid out of the recovery fluid outlet.

66. A moving bed desorber apparatus according to claim 65 wherein the vane members are spaced approximately 5-25 mm apart.

67. A moving bed desorber apparatus according to claim 65 wherein the spaces between the vane members are large enough to permit adsorbent to pass therethrough but the downward slope of the vane members is sufficient to prevent any substantial amount of adsorbent from entering the spaces between the vane members.

68. A moving bed desorber apparatus according to claim 65 wherein the vane members are sloped downwardly at angles of approximately 10-45 degrees.

69. A moving bed desorber apparatus according to claim 65 wherein the vane members are sloped downwardly at angles of approximately 15-30 degrees.

70. A moving bed desorber apparatus according to claim 65 wherein said at least two adsorbent flow channels are configured and positioned to generally form a "V."

71. A moving bed desorber apparatus according to claim 65 wherein said at least two adsorbent flow channels are configured and positioned to generally form a substantially inverted "V."

72. A moving bed desorber apparatus according to claim 65 wherein said at least two adsorbent flow channels are configured and positioned to generally form a substantially non-inverted "V".

73. A moving bed desorber apparatus according to claim 70 wherein the angle between said at least two adsorbent flow channels generally forming the "V" shape is approximately 20-90 degrees.

74. A moving bed desorber apparatus according to claim 70 wherein the angle between said at least two adsorbent flow channels generally forming the "V" shape is approximately 20-45 degrees.

75. A moving bed desorber apparatus according to claim 65 further comprising an adsorbent flow splitter for dividing the incoming flow of adsorbent such that adsorbent will flow through each adsorbent flow channel.

76. A moving bed desorber apparatus according to claim 65 wherein the adsorbent depth regulator comprises a screen.

77. A moving bed desorber apparatus according to claim 65 wherein the adsorbent depth regulator comprises a series of spaced apart baffles.

78. A moving bed desorber apparatus according to claim 65 further in combination with a quantity of adsorbent that is passable through the adsorbent flow channel, wherein the adsorbent depth regulator is constructed such that fluid that has passed through the adsorbent may pass through the adsorbent depth regulator but substantial amounts of the adsorbent will not pass through the adsorbent depth regulator.

79. A moving bed desorber apparatus according to claim 65 wherein the adsorbent flow channel has a substantially uniform width.

80. A moving bed desorber apparatus according to claim 65 wherein adsorbent flows through said at least two adsorbent flow channels substantially at plug flow.

* * * * *